United States Patent Office 3,087,718
Patented Apr. 30, 1963

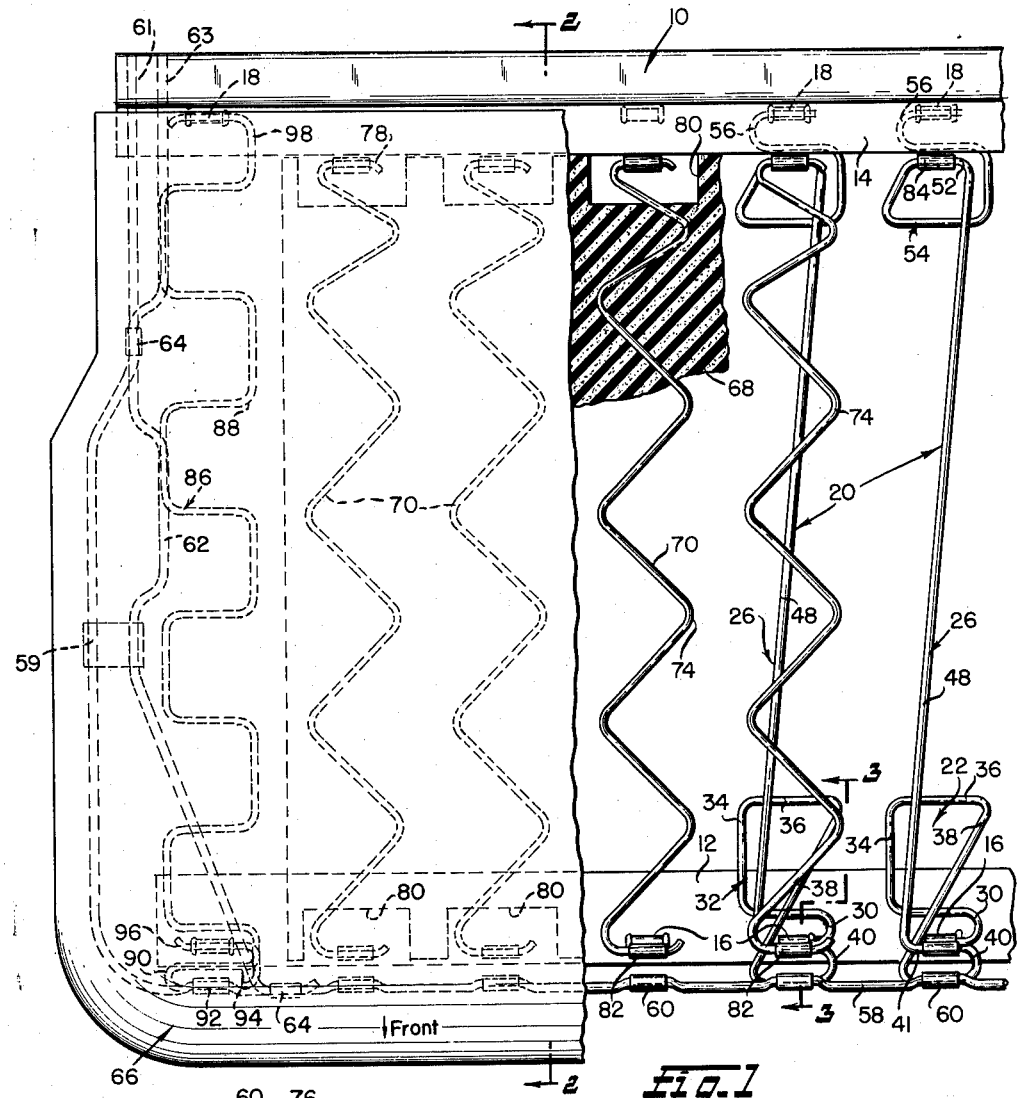
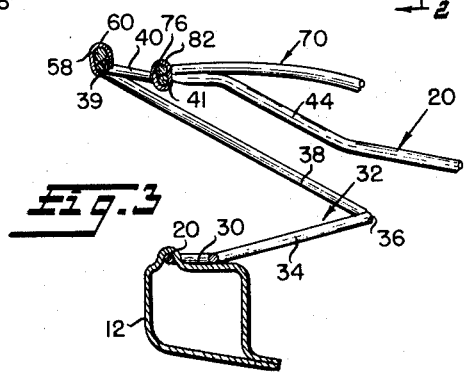
Fig.1
Fig.3
INVENTOR.
Raymond W. Brown

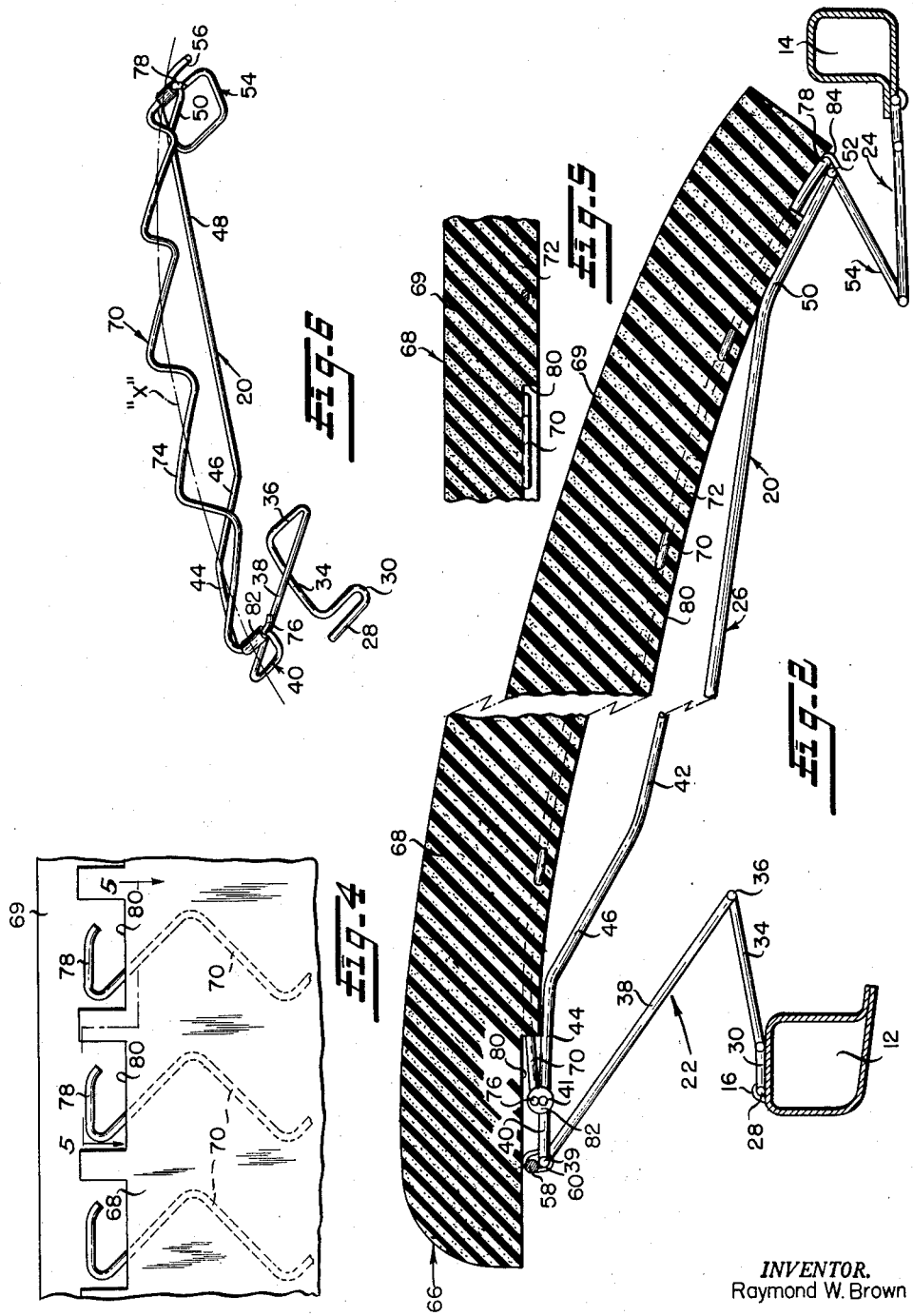

3,087,718
SEAT ASSEMBLY
Raymond W. Brown, Warren, Mich., assignor to Rockwell-Standard Corporation, Coraopolis, Pa., a corporation of Pennsylvania
Filed Dec. 19, 1960, Ser. No. 76,649
14 Claims. (Cl. 267—81)

The present invention refers in general to flexible seat structure mainly for vehicles and more particularly to seat cushions with imbedded springs and special assemblies including the same.

Conventional vehicle seats are conventionally made of a heavy frame and spring construction which supports the usual padding, fabrics and other upholstery material to provide thick cushioned seats. These seat structures are very heavy, expensive and time consuming in assembly and embody several undesirable faults. For example, the metal springs may start to squeak after a time, the upholstery material may deteriorate due to the abrasive and flexure action of the underlying metal springs, the upholstery is difficult to clean due to the porous material which collects dust and dirt, this conventional upholstery material is easily damaged by moisture and releases an unpleasant odor when wet and after a certain time of use becomes stretched and indented in places where prolonged pressure is applied due to its inability to recover and maintain its original shape. In general, those conventional padded cushion seats are too bulky and heavy as to conform to present day automobile requirements.

It has been proposed to substitute rubber, rubber compounds, latex, or more recently, urethane foam instead of the conventional upholstery material. Because of the built-in resilience of this rubber or rubber-like material, fewer metal springs are required and the overall thickness and weight of the cushion can be appreciably reduced, which is important in view of the ever decreasing vertical space available in today's automobiles and even more so in public conveyances. Due to the ability of the rubber or rubber-like material to be formed, pressed, molded, or cut into any desirable shape it is obvious that this material is applicable to a wide variety of installations and assembly is being very much facilitated.

Of all the rubber or rubber-like substances used for such cushions it has been found that urethane foam is the most versatile. Urethane foam is tough and adequately resilient. It can be cut, perforated and sewn and provides excellent resistance against oxidation and weather conditions. The overall cushioning effect may be up to double that of other known foam rubber. However, difficulties have been experienced in securing and maintaining the relatively smooth surfaced urethane cushion in its place on the frame of a seat especially in regard to the underlying metal springs. It has been found even more difficult to position and design the underlying metal spring members so as to provide substantially uniform load distribution along the entire seat.

It is the major object of the present invention to provide for automotive vehicle seats and the like a novel relatively thin polyurethane or like resilient cushion having metal springs embodied therein preferably near the lower surface thereof, the terminal ends of which springs extend out of the foam material to be attached thereby to supporting members.

Another object of the present invention is to provide a polyurethane or equivalent seat cushion for automotive vehicle seats having a number of side by side essentially longitudinal flat sinuous metal springs embedded therein at least at the load supporting sections of the cushion.

Still another object of the present invention is to provide in automobile seats primary cushion supporting longitudinal sinuous wire springs attached at both ends to a support frame and adapted to support a molded polyurethane seat cushion having imbedded springs secured to said primary springs.

It is an object of the invention to provide a novel vehicle seat cushion wherein a normally flat resilient body of foam polyurethane or the like contains a series of longitudinally extending laterally spaced permanently imbedded springs that project at their opposite ends out of the body. It is an attendant object of the invention to incorporate such a cushion in novel assembly with a supporting frame and spring assembly wherein side by side longitudinal support springs, which are laterally spaced about the same distances as the springs embedded in the cushion, are mounted on the frame, and the ends of the imbedded springs are attached to the support springs.

Further objects and novel features will become apparent as the description proceeds in connection with the appended claims and with reference to the attached drawings wherein:

FIGURE 1 is a fragmentary top plan view of an automobile seat assembly according to a preferred embodiment of the present invention with part of the cushion broken away and in section;

FIGURE 2 is an enlarged cross section through the seat assembly of FIGURE 1 substantially along line 2—2;

FIGURE 3 is a cross section through the seat assembly attaching members and joints substantially along line 3—3 of FIGURE 1;

FIGURE 4 is a fragmentary bottom plan view of the seat cushion of the present invention;

FIGURE 5 is a fragmentary cross section through FIGURE 4 along line 5—5 thereof; and FIGURE 6 is a perspective view of the assembled metal spring unit with the cushion omitted.

In FIGURE 1 is illustrated a vehicle seat assembly comprising a rigid support frame 10 having a front transverse rail 12 and rear transverse rail 14 which are rigidly interconnected in the usual way by side frame members (not shown) to form a rectangular frame construction. Front rail 12 has a series of equally spaced sockets 16, and rear rail 14 has a series of like sockets 18 opposite thereof, and essentially parallel longitudinal spring units 20 are attached at opposite ends to these frame sockets. The terms transverse and longitudinal refer herein to the vehicle axis.

FIGURES 2 and 6 show the spring units 20 as each formed to a given shape from a length of spring steel wire to provide a multiple looped front spring supporting portion 22 and a multiple looped rear spring supporting portion 24 joined by a linear portion 26. Portions 22 and 24 (see FIGURE 2) are effectively torsion spring columns to permit the necessary load deflection, and the linear portion 26 is under tension when the seat is loaded. A laterally extending free end 28 of the front torsion column 22 extends within the socket 16 of the front rail 12 at the end of a loop 30 which rests upon the upper surface of front rail 12 (FIGURES 2 and 3). To reduce torsional stress on the end loop 30 during load deflection, the wire is formed with loop section 32 which consists of a longitudinal straight portion 34 extending upwardly and rearwardly from loop 30, a horizontally disposed transverse portion 36, and an upwardly and forwardly extending longitudinal straight portion 38. As shown in FIGURE 1, portion 38 is disposed at an angle to the longitudinal centerline of the spring unit 20 to cross well above the end loop 30 and (FIGURE 6) is formed at the upper end with a transverse horizontally disposed loop section 40 which is joined to longitudinally rearwardly extending tension wire unit 26 as will appear.

The front torsion column 22 thus far described provides a spring front end construction which is familiarly known in the trade as "fish mouth" (see FIGURE 2) to add the necessary suspension depth to the seat when compressed under load, and it will be evident that the larger part of the torsion load will be absorbed by the support loop section 32 to appreciably reduce strain and stress on the attachment end loop 30. Due to the above described formation of loop section 32 early fatigue of the spring unit is prevented.

The longitudinal tension wire unit 26 comprises a transverse end portion 41 which is the rear transverse leg of loop 40, a short longitudinal rearwardly and downwardly bent portion 44 which merges rearwardly into a short steeper angularly downwardly directed portion 46 in turn joined to a longer straight portion 48 of less angularity which at the rear is formed with a short straight angular portion 50. Tension wire portion 48 extends rearwardly at a slight angle to the longitudinal center line of the spring unit 20 as shown in FIGURE 1 and its rear end is formed with a transverse portion 52 and a forwardly and downwardly disposed torsion loop section 54 which is part of spring support 24 and is adapted to function similar to the front torsion loop section 32. Loop section 54 is joined to a laterally disposed reverse end attachment loop 56 which is secured to socket 18 of rear rail 14 in assembly. The sharper angular sections 46 and 50 of the tension wire 26 function to allow slight longitudinal extension of the tension wire when the spring unit 20 is compressed under load.

To provide necessary front end stabiilty, the spring units 20 are all interconnected at their front ends by a transverse border wire 58 as by clips 60 which extend around the outer transverse bars 39 of loops 40 and wire 58. Border wire 58 extends along and above front rail 12 and around at the sides of the seat through a guide 59 to be attached at 61 to the rear rail 14 (FIGURE 1). On each side of the seat a torsion wire 62 may be provided which is likewise secured to the rear rail 14 at 63 and attached at several points to the border wire 58 as by means of clips 64 to absorb the torsion load to which the border wire is subjected when the seat is under compression. In general, the spring units 20 may be incorporated in any frame structure other than the specific embodiment disclosed which should be considered as illustrative only.

Thus, self-contained highly flexible cushion supporting spring units 20 are provided, any desired number of which may be used in side by side longitudinal relation to provide a preassembled metal frame and spring structure especially adaptable to mount the resilient cushion unit hereinafter described.

With further reference to FIGURES 2, 4 and 5, the resilient cushion assembly 66 of the invention comprises a molded foam rubber cushion body 68 which may be preferably made from polyurethane compound because of its toughness and resistance against oxidation and moisture. The resilient cushion body 68 is of spongy cellular internal structure so as to be compressible and preferably molded in one piece to extend the entire transverse and longitudinal dimensions of the seat and is circumferentially shaped to provide the desired contour. The cushion body 68 is of substantially constant thickness and is normally flat when not assembled.

To add rigidity to the flat resilient cushion body 68, a series of parallel longitudinal flat laterally sinuous type metal wire springs 70 are imbedded within the cushion near the lower surface thereof. Springs 70 are preferably embedded in cushion 68 at such a distance from the bottom that the springs would not be felt from the top when the cushion is compressed by a seated person but sufficiently deep within the body so as to prevent rupture of the material during load deflection. It is furthermore only necessary to provide these springs inserts 70 at the actual load supporting sections of the cushion; that is, to the left and right of the center section in an automobile front seat and spaced from the borders of the seat, to further reduce cost and weight of the assembly. To this end, the referred to load supporting sections of the cushion body 68 provide an enlarged cross section area 72 in which the springs 70 are imbedded.

To firmly imbed the springs 70 into the cushion material several methods may be used. For example, the material may be poured around the springs held in a mold to provide a homogeneous body. Alternatively the larger upper portion 69 of the cushion body may be molded separately with the springs placed on the bottom side of the molded cushion part in proper position and liquid polyurethane sprayed over the springs to provide the imbedding section 72. The sprayed on material will firmly unite with the main part of the cushion.

Another method is to mold separate resilient portions 69 and 72 as layers and vulcanize or otherwise bond them together with the springs in proper place between them. A variation of this last method is to separately form the thicker upper layer 69 of softer resilient material, imbed the springs in proper location within a thinner tougher layer 72 and vulcanize the layers together. In the last two mentioned methods it is possible to use for the spring enclosing layer 72 a different compound for damping of the spring elements, if found necessary. In any event the springs 70 are placed in such position to correspond with the distance between the assembled spring units 20 as shown in FIGURE 1. Springs 70 may each comprise a number of opposed V-shaped loops 74 lying generally in a horizontal plane and have similar terminal ends 76 and 78 respectively which project out of the cushion body through provided recesses 80 a distance from the front and rear edges of the cushion proper The cushion body 68 with imbedded springs 70 is relatively flat in unassembled position but in assembly assumes a curved configuration, as illustrated in FIGURES 2 and 6, by attaching terminal end 76 to the rear transverse bar 41 of loop 40 of the spring unit 20 as by clip 82 and terminal 78 to the transverse bar 52 on the other end of tension wire 42 as by clip 84 This initial curvature imparted to the cushion assembly 66 upon assembly establishes a predetermined tension which is overcome by applying load to this surface of the cushion setting up torsion in the torsion columns 22 and 24 of the spring unit 20 which will be readily absorbed. Upon removal of the load the initial curvature of the unit is restored by the reverse acting forces of the loaded spring unit. As indicated by the line "X" in FIGURE 6 the cushion support load is equally distributed along each spring unit 20 approximately along its longitudinal center.

The lateral spacing of imbedded springs 70 is chosen to be essentially that of the spring units 20 so that in the final assembly each spring 70 will directly overlie in substantially centered relation a support spring unit 20.

The imbedded springs 70 may be used in the primary load supporting areas of the cushion 66 whereas the center section and border areas may be freely supported, as for example on longitudinal flat springs 86 which may be of the sinuous type as shown in FIGURE 1 and provide a number of rectangular loops 88. The front end of spring 86 is provided with a loop 90 which is attached by a clip 92 directly to the border wire 58 and extends downwardly and rearwardly in a straight portion 94 into an end attachment loop 96 attached to the end socket 16 of front rail 12. The rear end of spring 86 is provided with a hook end 98 which extends into end socket 18 of rear rail 14. The non-imbedded springs 86, which are positioned to the left and right of the spring imbedded load supporting sections 72 of the cushion 68, may be stiffer than the other spring elements in order to provide firmer support at the center and sides of the seat assembly.

Thus, there has been provided an improved seat and cushion construction made of a combination polyurethane or like resilient material cushion with imbedded spring elements supported on independent spring units attached to the seat frame. This novel seat assembly is light in weight and low in cost and easily assembled into a self-contained unit.

Torsion and compression stresses set up in the metal spring members are easily absorbed by the novel arrangement and configuration of said spring members. By tying the ends of the imbedded springs 70 in the cushion directly to the ends of the separate support springs directly beneath them, the effective uniform transmission of load is increased with no localized support regions.

The polyurethane cushion body of the invention with imbedded springs 70 may be used in other applications as well, as for instance back rests, furniture, etc., with but few alterations to the end connections.

In the assembly the polyurethane foam material acts as a spacer and thereby eliminates the usual spacer pads now used between cushion seats and spring assemblies.

In all embodiments of the invention the bottom surface of the foam rubber cushion body may be formed with a tough water impervious skin 80 which is under tension when a person is seated on the seat and acts as a resilient sheet to more uniformly distribute the deflection loads. This skin 80 may be a separate vulcanized-on sheet of extremely tough resilient material.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle seat asembly comprising a main support spring having a relatively rigid frame and resilient spring means comprising a plurality of support spring units extending in side by side relation longitudinally of said frame and mounted at opposite ends on said frame, and a separate unitary seat cushion mounted in overlying relation to said main support spring, said cushion extending laterally across the entire frame and comprising a resilient member having a plurality of permanently imbedded side by side laterally sinuous wire springs extending longitudinally of said frame with each of said wire springs laterally spaced apart approximately the same distance as said support springs and in substantially overlying relation thereto in the assembly, and means securing the ends of said sinuous wire springs of said cushion unit directly to said resilient spring means in the assembly 2. In the seat assembly defined in claim 1, said cushion unit being normally flat and of substantially uniform thickness with said sinuous wire springs extending therethrough to project therefrom front and rear, the upper ends of support springs being higher than their rear ends on the frame, and said cushion unit being deformably held upon the top of the frame and support spring assembly by means securing said projecting wire spring ends to the support spring ends therebeneath.

3. In the seat assembly defined in claim 1, said support springs each comprising torsion spring columns rising up from the frame, each of said imbedded wire springs having their ends projecting out of said resilient member, and means securing said ends directly to associated support springs adjacent the upper ends of said columns.

4. In the vehicle seat assembly defined in claim 1, the resilient member of said separate seat cushion being a substantially uniform thickness member of resilient foam material adapted to flexibly conform to the main support spring beneath.

5. A resilient cushion unit for a vehicle comprising a body of resilient normally flat material of substantially uniform thickness, and a plurality of longitudinally extending laterally spaced wire springs permanently imbedded in said body with their ends projecting from said body for attachment to a support, each of said springs being a laterally sinuous wire spring lying essentially flat in the general plane of the body.

6. The cushion unit defined in claim 5, wherein said body of resilient material is a homogeneous member composed of cellular polyurethane.

7. The cushion unit defined in claim 5, wherein said body is composed of internally cellular rubber or rubber-like material formed with a tough skin across the bottom surface thereof and said wire springs extend through the body adjacent said skin.

8. A resilient cushion unit as defined in claim 5, wherein said body is recessed on its bottom surface at the projecting ends of said wire springs, said ends extending into said recesses.

9. A resilient cushion unit as defined in claim 5, wherein the wire springs are imbedded in a relatively shallow material layer at the bottom surface of said body.

10. The resilient cushion unit defined in claim 5, wherein said wire springs are imbedded between two coextensive layers of resilient material in said body.

11. The resilient cushion unit defined in claim 9, wherein the wire springs are imbedded in a layer of material that is tougher than the softer upper layer.

12. In a vehicle seat assembly, a rigid frame adapted to be attached to the vehicle floor, a plurality of longitudinally extending laterally spaced side by side support springs attached at opposite ends to said frame, each of said support springs comprising front and rear torsion columns connected at their upper ends by a tension wire, and a resilient seat cushion mounted in said assembly comprising a solid body of resilient material extending all the way across the assembly and having effectively imbedded therein a plurality of side by side substantially flat wire springs with their ends projecting out of said material, and means attaching said wire spring ends to the support springs at the upper ends of said columns.

13. A vehicle seat assembly comprising a relatively rigid frame, resilient cushion means comprising a body of resilient material of substantially uniform thickness extending all the way across the assembly above said frame and having permanently imbedded therein a plurality of side-by-side substantially flat laterally sinuous wire springs that extend longitudinally therethrough in laterally spaced apart relation, the opposite ends of said springs projecting from the body and connected to said frame by means comprising support spring sections of fish-mouth structure.

14. In a vehicle seat assembly, a rigid frame adapted to be attached to the vehicle floor, a plurality of laterally spaced side-by-side support spring means attached to the frame and comprising front and rear spring columns of fish-mouth structure, each front column being longitudinally aligned with a rear column, and a seat cushion above the frame comprising a body of resilient material of substantially uniform thickness extending all the way across the assembly and having permanently imbedded therein a plurality of side-by-side longitudinally extending substantially flat laterally sinuous wire springs, each said wire spring having its ends projecting from said body and united with a longitudinally aligned pair of said front and rear support spring columns.

References Cited in the file of this patent
UNITED STATES PATENTS

| | | |
|---|---|---|
| 1,843,893 | Becher | Feb. 2, 1932 |
| 2,845,996 | Flint | Aug. 5, 1958 |
| 2,897,879 | Brown | Aug. 4, 1959 |